Jan. 27, 1953 W. C. HAND 2,626,855
SEAFOOD SPOILAGE INDICATING SYSTEM
Filed June 26, 1950
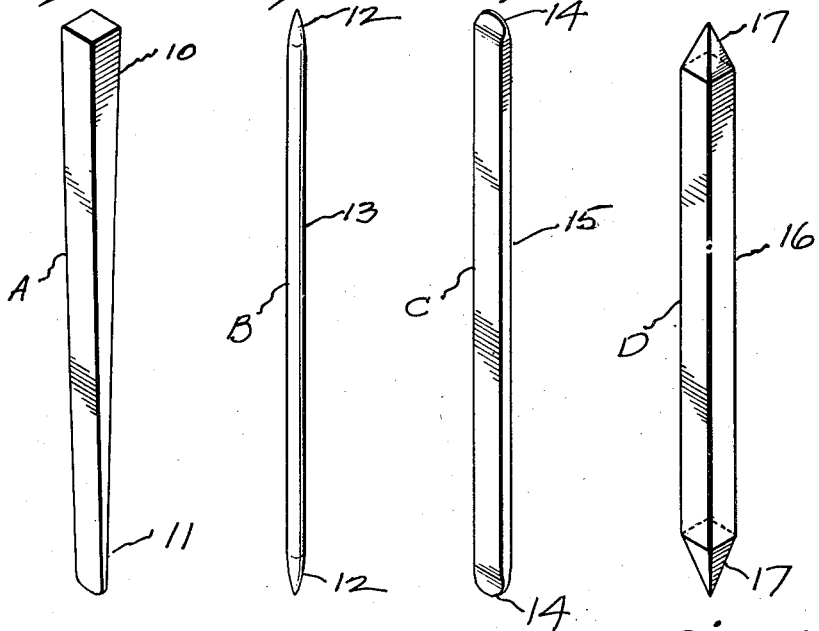
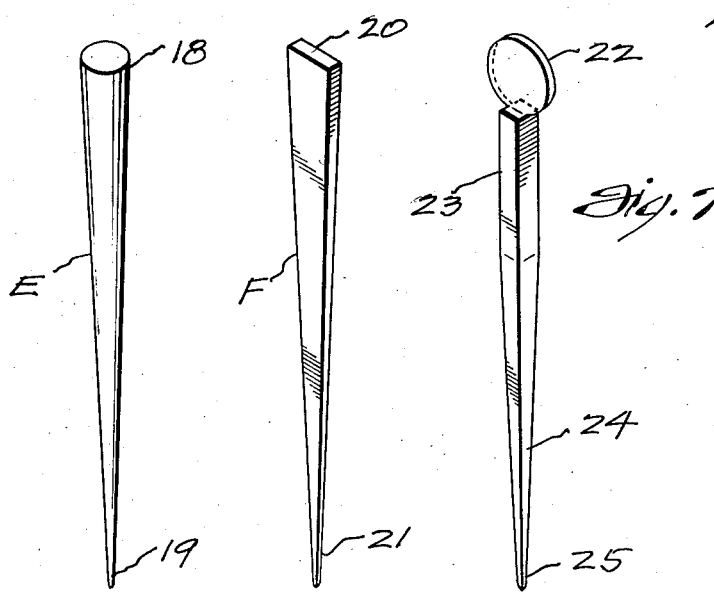
INVENTOR.
WILFRED C. HAND
BY
ATTORNEY Patented Jan. 27, 1953

2,626,855

UNITED STATES PATENT OFFICE 2,626,855

SEAFOOD SPOILAGE INDICATING SYSTEM

Wilfred C. Hand, Mountainside, N. J.

Application June 26, 1950, Serial No. 170,367

9 Claims. (Cl. 23—230)

The present invention relates to an indicator for readily indicating food spoilage and it particularly relates to an indicator which may be utilized in connection with seafoods.

It is among the objects of the present invention to provide an indicator which may be readily used in connection with seafoods to determine the condition thereof from the viewpoint of spoilage, which may be readily employed by a housewife as well as an owner or operator of a food shop, and which will not destroy or mar the food and which may readily be utilized even though the food in question being tested is enclosed in a shell, claw or other protective covering.

Another object is to provide an indicating system which may be employed by housewife, chef or distributor of the seafood liable to spoilage upon shipment or standing, to indicate whether such foodstuffs are spoiled, without destruction of seafood or removal of samples and without requiring long chemical tests, and which may be readily employed by the user of the foodstuffs as well as by the retailer or wholesaler thereof to obtain an instantaneous determination.

Still another object is to provide a manner and means for determining the presence of putrescence or ptomaines in foodstuffs and particularly seafood which may be readily employed by the housewife, retailer or wholesaler without marring the foodstuffs or treating the shell or covering and which will give reliable and assured instantaneous indication of the condition of the foodstuffs without the need of resorting to chemical laboratories and prolonged, expensive and costly test and determinations.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory, according to one embodiment of the present invention, to provide a pointed indicator device which may be readily inserted in seafoods, such as lobsters, crabs, oysters, clams, mussels, mollusks, shrimp, fish and the like, which will give a ready color indication as to the state of such foodstuffs or the chemically changed character thereof associated with spoilage and the presence of ptomaines and other harmful products of putrefaction.

In a preferred form of the invention, the indicator may take the form of an elongated, pointed, small diameter, wooden or plastic stick or inserter, which is suitably impregnated or carries a harmless chemical indicator which will change color and give an immediate indication of the presence of acid conditions normally indicating putrefaction or presence of ptomaines or amino products as for example in seafood, fish, meats and other protein food products.

Desirably, the indicator is impregnated or absorbed or placed upon the pointer device so that it will be present in sufficient quantity and strength to give a satisfactory color change.

At the same time the indicator should not be present in sufficient quantity to come off the implement and cause any change in the character of the foodstuffs.

The desired indicators are those which give a brillant color change in the presence of toxic materials. In spoiled shellfish, for example, the preferred indicators are phenol red, and circumin which indicate presence of substituted amines. These indicators are active at a range of 6 to 8 and they readily indicate the presence of amino condensation products resulting from putrefaction and they are non-poisonous. Circumin and hematoxylin are also specifically sensitive and give color changes in connection with the putrefaction of many protein products.

For example, as illustrative of some of these color changes, phenol red will change from a pale yellow to a deep red.

Circumin will change from a pale yellow to a deep brownish red.

Hematoxylin will change from yellow to reddish purple.

These indicators may give color changes as a result of the presence of substituted amines due to putrefaction, the change in acid conditions or pH of the foodstuff, or due to the reducing character of the spoiled foodstuff.

For example, to indicate spoilage in case of reducing putrescence the indicator may be bleached or the color removed as would occur with change of indigoid or anthracene dyes to lunco-derivatives or upon reduction of a brown colored ferric compound to a colorless ferrous compound.

Phenol red and circumin are particularly effective with the color changes resulting with changes in pH from an acid condition of pH 3 to 5 to an alkaline condition of pH 6 to 8.

The indicators are of low solubility, will not tend to become absorbed into the foodstuffs, and even though there is a relatively small quantity of them upon the device, they will effectively indicate the presence of amino decomposition products or other types of putrefaction.

The above is by way of specific illustration and it is understood that any type of thin, pointed indicator-carrying element may be utilized which will not contaminate or change the character of the foodstuffs, whether it be a glass pointer, a plastic pointer of various synthetic resins or a wooden pointer and it should be capable of carrying the chemical indicator in sufficient amount to give the desired color change. The indicator should be of such a porous or adsorptive nature as not to lose any of the chemical indicator to the foodstuff being tested. Even a metal needle carrying a thread impregnated with the indicator may be used, or may also polished metal needle— as of silver—to detect presence of decolorizing or blackening sulfur compounds arising during spoilage.

Generally, the device should be capable of being inserted into the interior of the foodstuffs and then withdrawn without destruction of such foodstuffs.

The invention finds a particular application in testing of seafood enclosed in shells or coverings such as lobster claws or crab claws or even fish or meat, where a pointed thin stick of wood or compressed paper carrying the absorbed indicator may be inserted into the small openings at the end of the claw through the end membranes, or along the bone or joint to give an indication of the freshness or spoilage of the foodstuffs at different positions and depths without removing a sample for laboratory testing and without boring into or breaking the shell or covering.

For example, an alcohol solution of hematoxylin may be used to impregnate the thin pointed stick and it will give purplish red indication upon presence of breakdown products of putrefaction.

This indicating system may be used for testing sausage, meat cakes, stew, hash, fish cakes, and other hashed ground or prepared protein foods as well as meats and fish in sliced, filet or whole condition, cooked or uncooked.

It is applicable to cream puffs and bakery products as well as whole fruits and vegetables such as melons, grapefruit, watermelons, bananas, mushrooms, persimmons, peaches, and avocados, as well as canned or frozen fruits, vegetables, meats, fish and salads.

With a clam, mussel, oyster or mollusk or even a snail, or even hams, bacons, cornbeef or canned meats, the putrefaction will cause a pH change which may readily be detected by a toothpick impregnated with phenol red which will be changed from pale yellow or straw color to bright red.

Where aldehydes, thio-compounds, proteoses or mercaptans are formed or oxidizing or reducing conditions ensue as a result of the spoilage, suitable other color indicators sensitive to their presence may be used to impregnate the pointed absorbent stick or a combination of indicators may be employed.

Each portion of the foodstuff may be tested in this manner and at different depths.

The system of the present invention enables any layman to use a positive test rather than his or her sense of smell or the appearance of the foodstuff to obtain an immediate indication and analysis of spoiled foodstuffs without need of sampling or use of chemists or food laboratories.

A housewife or chef or fish or meat monger may immediately check suspected spoilage in foodstuffs and good foodstuffs need no longer be wasted on mere suspicion.

An essential feature is that an immediate visual indication is obtained without marring or disfiguring the foodstuff, by merely inserting a toothpick impregnated with the indicator material into a crab claw, sausage or cream puff.

The pick, when withdrawn, will give both a general indication as well as an indication of condition at different depths and it is not necessary to remove any of the sample.

A mixture of indicators or spotting of indicators along the pointed stick or toothpick may also be employed.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figs. 1 to 7 are each side perspective views showing various forms of elongated, pointed, small diameter, wooden sticks or inserters which may be utilized for the purposes of the present invention.

Referring to Fig. 1, the stick or inserter A has a relatively square head or hand grip portion 10 with a wedge-like, thin portion 11 to be inserted into the composition to be tested.

In Fig. 2 the stick or inserter B has two sharp ends 12 and is of circular cross section in the middle area 13.

In Fig. 3 the stick or inserter C is flat and has bevelled, relatively sharp end portions 14 and has a rectangular cross section over the middle portion 15.

In Fig. 4 the stick or inserter D has a square cross section 16 with the pyramidal pointed end portions 17.

In the device of Fig. 5, there is a relatively wide circular end 18 forming the base of an inverted cone which terminates in a sharp point 19.

In the device of Fig. 6 the wide or broad upper end 20 of the wedge F terminates in the point 21.

In the device of Fig. 7, there is a disk end 22 which may be gripped by the fingers, extending upwardly from a square end portion 23, which has a converging portion 24 forming a point 25.

In the structures of Figs. 1 to 7, in each instance there is a sharp entering edge or point with a large enough intermediate surface between the ends of the device to enable easy reading of the indication.

The pick should be strong enough to be readily inserted and withdrawn without breakage, not subject to deterioration after impregnation and drying when stored, shipped or utilized by the housewife, chef, retailer, wholesaler or restaurant, which will not discolor or contaminate or change the appearance of the tested foodstuff.

The embodiment of the invention shown and described herein is to be considered merely as illustrative, as the invention is susceptible to variation, modification and change within the spirit and scope of the appended claims.

Having now particularly described and ascertained the nature of the invention, and in what manner the same is to be performed, what is claimed is:

1. An elongated sharp pointed indicator for shellfish and other solid foodstuffs consisting of a pointed element and a color indicator thereon, said indicator being a complex organic compound giving a brilliant color change in the presence of toxic materials and being active at a pH range of 6 to 8 and particularly indicating the presence of amino condensation products resulting from putrid action and being selected from the group consisting of phenol red, circumin and hematoxylin.

2. An elongated sharp pointed indicator for spoilage in shellfish and other solid foodstuffs comprising an elongated pick element carrying a color indicator thereon to indicate spoilage, said indicator being a complex organic compound giving a brilliant color change in the presence of toxic materials and being active at a pH range of 6 to 8 and particularly indicating the presence of amino condensation products resulting from putrid action and being selected from the group consisting of phenol red, circumin and hematoxylin.

3. An elongated, pointed food spoilage indicator consisting of wood having absorbed thereon a chemical indicator showing a color indication upon the presence of amino decomposition products, said indicator being a complex organic compound giving a brilliant color change in the presence of toxic materials and being active at a pH range of 6 to 8 and particularly indicating the presence of amino condensation products resulting from putrid action and being selected from the group consisting of phenol red, circumin and hematoxylin.

4. A method of indicating spoilage in solid foodstuffs which consists of inserting an elongated sharp pointed indicator into the interior of the foodstuffs, withdrawing the same and then observing any noticeable color change in the indicator without marring of such foodstuffs, said indicator being a complex organic compound giving a brilliant color change in the presence of toxic materials and being active at a pH range of 6 to 8 and particularly indicating the presence of amino condensation products resulting from putrid action and being selected from the group consisting of phenol red, circumin and hematoxylin.

5. A pointed elongated stick capable of being inserted without breakage into shellfish and other solid foodstuffs without damage or destruction thereof, impregnated with an indicator to show putrefaction or spoilage, said indicator being a complex organic compound giving a brilliant color change in the presence of toxic materials and being active at a pH range of 6 to 8 and particularly indicating the presence of amino condensation products resulting from putrid action and being selected from the group consisting of phenol red, circumin and hematoxylin.

6. A pointed elongated stick capable of being inserted without breakage into shellfish and other solid foodstuffs without damage or destruction thereof, impregnated with an indicator to show putrefaction or spoilage, said indicator being sensitive to amines, said indicator being a complex organic compound giving a brilliant color change in the presence of toxic materials and being active at a pH range of 6 to 8 and particularly indicating the presence of amino condensation products resulting from putrid action and being selected from the group consisting of phenol red, circumin and hematoxylin.

7. A method of indicating spoilage in solid foodstuffs which consists of inserting an elongated sharp pointed indicator into the interior of the foodstuffs, withdrawing the same and then observing any noticeable color change in the indicator without marring of such foodstuffs, said indicator consisting of phenol red.

8. A method of indicating spoilage in solid foodstuffs which consists of inserting an elongated sharp pointed indicator into the interior of the foodstuffs, withdrawing the same and then observing any noticeable color change in the indicator without marring of such foodstuffs, said indicator consisting of circumin.

9. A method of indicating spoilage in solid foodstuffs which consists of inserting an elongated sharp pointed indicator into the interior of the foodstuffs, withdrawing the same and then observing any noticeable color change in the indicator without marring of such foodstuffs, said indicator consisting of hematoxylin.

WILFRED C. HAND.

REFERENCES CITED

The following references are of record in the file of this patent:

UNITED STATES PATENTS

| Number | Name | Date |
| --- | --- | --- |
| 458,244 | Tyree | Aug. 25, 1891 |
| 1,216,303 | Freeman | Feb. 20, 1917 |
| 1,447,528 | Bouwman | Mar. 6, 1923 |
| 2,244,336 | Horn | June 3, 1941 |
| 2,519,997 | Brown | Aug. 22, 1950 |

FOREIGN PATENTS

| Number | Country | Date |
| --- | --- | --- |
| 496,345 | Great Britain | Nov. 29, 1938 |